(12) United States Patent
Fu

(10) Patent No.: US 11,461,179 B2
(45) Date of Patent: Oct. 4, 2022

(54) SYSTEM RECOVERY METHOD AND APPARATUS

(71) Applicant: Huawei Technologies Co., Ltd., Shenzhen (CN)

(72) Inventor: Wei Fu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/261,804

(22) PCT Filed: Sep. 30, 2018

(86) PCT No.: PCT/CN2018/109116
§ 371 (c)(1),
(2) Date: Jan. 20, 2021

(87) PCT Pub. No.: WO2020/015203
PCT Pub. Date: Jan. 23, 2020

(65) Prior Publication Data
US 2021/0279139 A1 Sep. 9, 2021

(30) Foreign Application Priority Data
Jul. 20, 2018 (CN) .......................... 201810804698.0

(51) Int. Cl.
*G06F 11/14* (2006.01)
*G06F 11/07* (2006.01)
(Continued)

(52) U.S. Cl.
CPC ........ *G06F 11/1417* (2013.01); *G06F 11/076* (2013.01); *G06F 11/1435* (2013.01); *G06F 11/3075* (2013.01); *G06F 11/327* (2013.01)

(58) Field of Classification Search
CPC ............. G06F 11/1417; G06F 11/3075; G06F 11/076; G06F 11/1435; G06F 11/327
See application file for complete search history.

(56) References Cited

U.S. PATENT DOCUMENTS 5,974,546 A * 10/1999 Anderson ........... G06F 11/2284
713/2
6,014,744 A * 1/2000 McKaughan ......... G06F 9/4401
713/100
(Continued)

FOREIGN PATENT DOCUMENTS

| CN | 103136116 A | 6/2013 |
| CN | 103927239 A | 7/2014 |

(Continued)

OTHER PUBLICATIONS

Windows-driver-content et al., "Windows Recovery Environment (Windows RE)," May 2, 2017, URL:https://docs.microsoft.com/zh-cn/windows-hardware/manufacture/desktop/windows-recovery-environment-windows-re-technical-reference, total 11 pages (May 2, 2017).

(Continued)

*Primary Examiner* — Kamini B Patel
(74) *Attorney, Agent, or Firm* — Leydig, Voit & Mayer, Ltd.

(57) ABSTRACT

Embodiments of this application provide a system recovery method and an apparatus and relate to the field of communications technologies, so as to more smoothly guide a user in implementing system recovery of an electronic device. The method is applied to an electronic device, comprising: obtaining a quantity of abnormal shutdowns of the electronic device at a BIOS boot stage of the electronic device; if the quantity of abnormal shutdowns of the electronic device is greater than or equal to a preset threshold, displaying a first interface, where the first interface includes a first system recovery mechanism option; and receiving a selection operation on the first system recovery mechanism option, and running a first system recovery mechanism in response to (Continued)

the selection operation on the first system recovery mechanism option.

18 Claims, 8 Drawing Sheets

(51) Int. Cl.
　　*G06F 11/30*　　　(2006.01)
　　*G06F 11/32*　　　(2006.01)

(56) References Cited

U.S. PATENT DOCUMENTS

| | | | | |
|---|---|---|---|---|
| 7,734,945 | B1* | 6/2010 | Levidow | G06F 11/0793 |
| | | | | 714/3 |
| 7,805,632 | B1* | 9/2010 | Luke | G06F 11/1471 |
| | | | | 714/6.12 |
| 8,868,898 | B1* | 10/2014 | Van Hoof | G06F 21/575 |
| | | | | 713/2 |
| 9,529,602 | B1* | 12/2016 | Swierk | G06F 9/441 |
| 2004/0221194 | A1 | 11/2004 | Denninghoff et al. | |
| 2005/0246582 | A1 | 11/2005 | Nash et al. | |
| 2005/0283638 | A1* | 12/2005 | Kato | G06F 11/0706 |
| | | | | 714/2 |
| 2006/0179353 | A1 | 8/2006 | Kawata | |
| 2009/0271660 | A1 | 10/2009 | Chin et al. | |
| 2012/0204060 | A1 | 8/2012 | Swift et al. | |
| 2013/0055019 | A1* | 2/2013 | Zhou | G06F 11/1417 |
| | | | | 714/21 |
| 2014/0223159 | A1 | 8/2014 | Lin et al. | |
| 2015/0074461 | A1* | 3/2015 | Yu | G06F 11/1417 |
| | | | | 714/36 |
| 2019/0079835 | A1* | 3/2019 | You | G06F 11/0757 |

FOREIGN PATENT DOCUMENTS

| | | |
|---|---|---|
| CN | 104008026 A | 8/2014 |
| CN | 105511976 A | 4/2016 |
| CN | 105786462 A | 7/2016 |
| CN | 105843712 A | 8/2016 |
| CN | 105847554 A | 8/2016 |

OTHER PUBLICATIONS

Teresa-Motiv et al., "WinRE Troubleshooting Features," Dec. 16, 2019, URL:https://docs.microsoft.com/zh-cn/windows-hardware/manufacture/desktop/windows-re-troubleshooting-features, total 6 pages (Dec. 16, 2019).

CN/201880095758.4, Office Action/Search Report, dated Jul. 1, 2022.

* cited by examiner

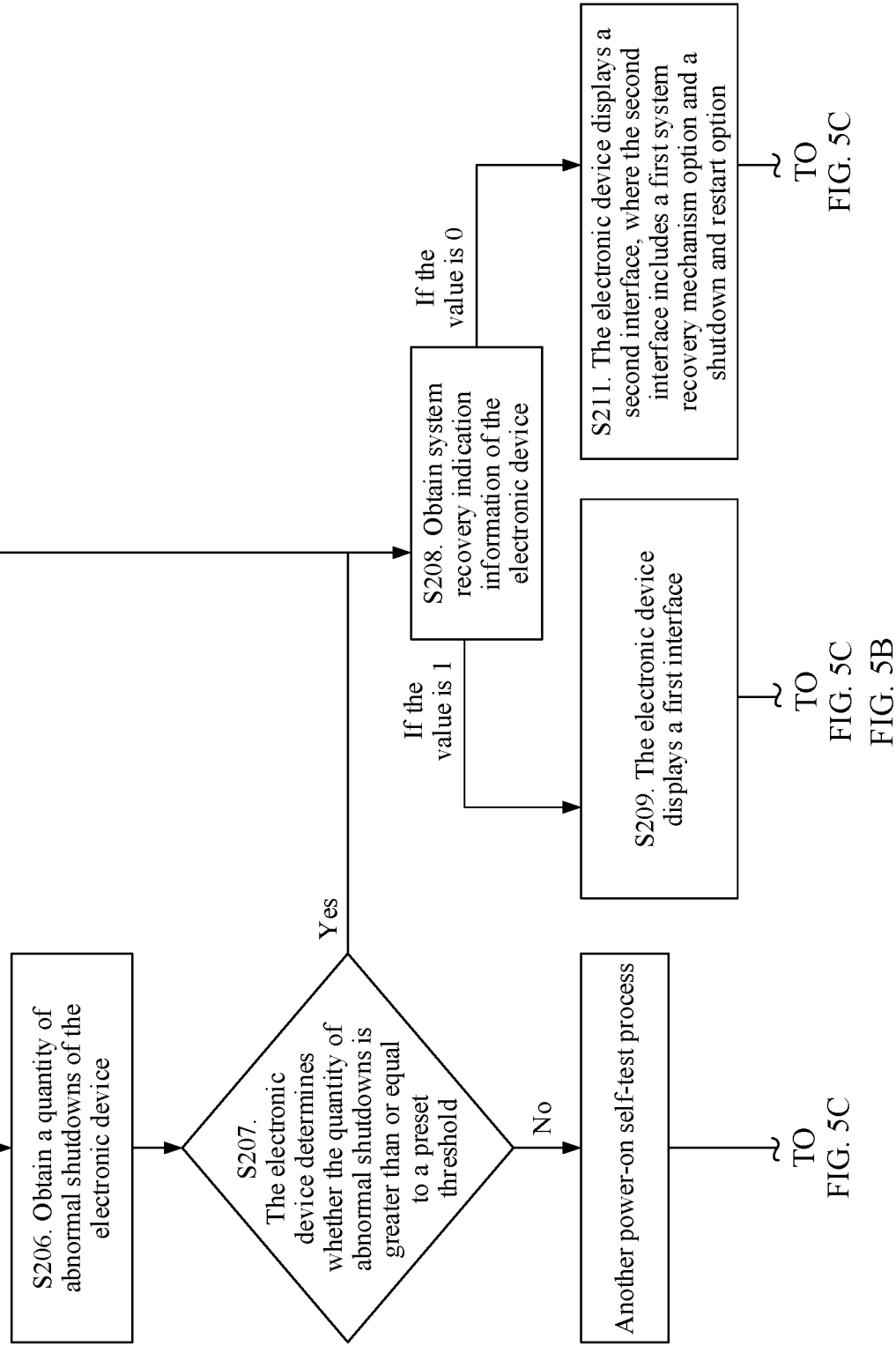

SYSTEM RECOVERY METHOD AND APPARATUS

CROSS-REFERENCE TO RELATED APPLICATIONS

This application is a National Stage of International Patent Application No. PCT/CN2018/109116 filed on Sep. 30, 2018, which claims priority to Chinese Patent Application No. 201810804698.0, filed on Jul. 20, 2018, both of which are incorporated herein by reference in their entities.

TECHNICAL FIELD

Embodiments of this application relate to the field of communications technologies, and in particular, to a system recovery method and an apparatus.

BACKGROUND

During startup of an electronic device (such as a computer), when an original system of the electronic device cannot be accessed due to damage, the factory setting restoration function of the system can be used to restore the system of the electronic device, so as to implement smooth startup.

A computer is used as an example. Usually, when a computer is started, a basic input output system (BIOS) is started first, and then the operating system (OS) is started. At present, after the computer completes the BIOS boot, the boot manager and the boot loader of the computer start the OS. If the computer cannot be started normally, the boot loader automatically boots the computer into the system recovery environment (such as WinRE: windows recovery environment), or the user manually presses the corresponding hot key (such as the F8 key) to make the computer enter the system recovery environment, so that the system of the computer is restored to factory settings.

However, in the foregoing method, if the computer is faulty before the OS startup, the computer cannot enter the system recovery environment, and as a result, the computer cannot work.

SUMMARY

Embodiments of this application provide a system recovery method and apparatus, so as to more smoothly guide a user in implementing system recovery of an electronic device.

To achieve the foregoing objective, the embodiments of this application use the following technical solutions:

According to a first aspect, an embodiment of this application provides a system recovery method, applied to an electronic device. The method includes: obtaining a quantity of abnormal shutdowns of the electronic device at a BIOS boot stage of the electronic device; if the quantity of abnormal shutdowns of the electronic device is greater than or equal to a preset threshold, displaying a first interface, where the first interface includes a first system recovery mechanism option; and receiving a selection operation on the first system recovery mechanism option, and running the first system recovery mechanism in response to the selection operation on the first system recovery mechanism option.

In the system recovery method provided in the embodiment of this application, at the BIOS boot stage during startup of the electronic device, when the quantity of abnormal shutdowns of the electronic device is greater than or equal to the preset threshold, a user can be guided in selecting a system recovery mechanism (for example, the foregoing first system recovery mechanism) according to needs, so that the electronic device runs the system recovery mechanism. In this way, the user can be more smoothly guided in implementing system recovery of the electronic device.

With reference to the first aspect, when the quantity of abnormal shutdowns of the electronic device is greater than or equal to the preset threshold, system recovery indication information is set, where the system recovery indication information is used to instruct the electronic device to display the first interface.

With reference to the first aspect, when the quantity of abnormal shutdowns of the electronic device is less than the preset threshold, the electronic device continues to start according to a normal startup process. For example, the electronic device continues to run a power-on self-test process, an operating system loading process, a process of calling back an ACPI by an operating system, and a process of responding to the ACPI callback of the operating system by the BIOS, and increases the quantity of abnormal shutdowns by 1, and then executes another operating system process.

In a first optional implementation of the first aspect, before the obtaining a quantity of abnormal shutdowns of the electronic device, the system recovery method provided in the embodiment of this application further includes: obtaining advanced startup indication information of the electronic device, where the advanced startup indication information is used to instruct the electronic device to run a second system recovery mechanism. In the embodiment of this application, a specific bit of a system restoration flag can be defined as advanced startup indication information. When the advanced startup indication information is 1, the electronic device is instructed to run the second system recovery mechanism. When the advanced startup indication information is 0, the electronic device is instructed to obtain the quantity of abnormal shutdowns.

In a second optional implementation of the first aspect, the foregoing first interface further includes at least one of the following: a second system recovery mechanism option, a startup-continued option, and a shutdown and restart option. If the quantity of abnormal shutdowns of the electronic device is greater than or equal to the preset threshold, the system recovery method provided in the embodiment of this application further includes: receiving a selection operation on the second system recovery mechanism option; and running the second system recovery mechanism in response to the selection operation on the second system recovery mechanism option. In the embodiment of this application, the first interface may include a plurality of options, so that the user can more flexibly select different options according to actual needs, and the electronic device then responds accordingly.

In a third optional implementation of the first aspect, the system recovery method provided in the embodiment of this application further includes: at the BIOS boot stage of the electronic device, if the user manually presses the first system recovery hot key, the electronic device displays a second interface, where the second interface includes a first system recovery mechanism option and a shutdown and restart option; and receiving a selection operation on the first system recovery mechanism option, and running the first system recovery mechanism in response to the selection operation on the first system recovery mechanism option. In the embodiment of this application, during power-on of the electronic device, the electronic device can automatically guide the electronic device in performing system recovery, and the user can press a hot key to actively trigger the electronic device to perform system recovery.

In a fourth optional implementation of the first aspect, the system recovery method provided in the embodiment of this application further includes: increasing the quantity of abnormal shutdowns by 1 during the startup of the electronic device; and during subsequent running of the electronic device, if the electronic device shuts down normally, clearing the quantity of abnormal shutdowns, or if the electronic device shuts down abnormally, skipping clearing the quantity of abnormal shutdowns. In the embodiment of this application, after the quantity of abnormal shutdowns is increased by 1 when the electronic device is started, if the electronic device subsequently shuts down abnormally, the quantity of abnormal shutdowns is not cleared. Therefore, during next power-on, the quantity of abnormal shutdowns can be obtained, and it can be determined, based on the quantity of abnormal shutdowns, whether to perform system recovery on the electronic device.

In a fifth optional implementation of the first aspect, the system recovery method provided in the embodiment of this application further includes: obtaining a status of an EC at the BIOS boot stage of the electronic device, where the status of the EC indicates whether there is a shutdown event triggered by a watchdog mechanism in the electronic device; and if there is a shutdown event triggered by the watchdog mechanism in the electronic device, reducing the quantity of abnormal shutdowns obtained by the electronic device at the BIOS boot stage by 1. In the embodiment of this application, when the watchdog mechanism in the electronic device triggers the electronic device to shut down, actually, the shutdown phenomenon is not regarded as an abnormal shutdown, but as a normal shutdown. However, during internal implementation of the electronic device, when the watchdog mechanism triggers the electronic device to shut down, the quantity of abnormal shutdowns described above also increases by 1, and the EC of the electronic device records (which can also be understood that the EC perceives) this event (that is, the shutdown event triggered by the watchdog mechanism). Therefore, during next startup of the electronic device, at the BIOS boot stage, the status of the EC is queried. In addition, when it is determined, based on the status of the EC, that there is a shutdown event triggered by a watchdog in the electronic device, the obtained quantity of abnormal shutdowns is reduced by 1 to obtain a true value of the quantity of abnormal shutdowns, and it is further determined whether to perform system recovery on the electronic device.

With reference to the fifth optional implementation of the first aspect, for an event that the watchdog mechanism triggers the electronic device in a sleep state to shut down, the electronic device clears the quantity of abnormal shutdowns described above (in other words, the quantity of abnormal shutdowns of the electronic device is not accumulated), and the EC does not record (that is, the EC does not perceive) this shutdown event triggered by the watchdog.

In a sixth optional implementation of the first aspect, the foregoing first system recovery mechanism is a system recovery mechanism customized by an OEM, and the second system recovery mechanism is a default system recovery mechanism of Windows. In comparison with the default system recovery option of Windows, using the system recovery mechanism customized by an OEM to perform system recovery has advantages of high speed and good commonality. In the embodiment of this application, the first system recovery mechanism and the second system recovery mechanism may also be other system recovery mechanisms.

In a seventh optional implementation of the first aspect, the foregoing abnormal shutdown of the electronic device includes at least one of the following: a forcible shutdown, and a shutdown of the electronic device after a blue screen appears. In the embodiment of this application, forcible shutdown means that the electronic device shuts down due to direct power-off (for example, power-off by manually pressing and holding the power button by the user); shutdown of the computer after a blue screen appears means that an exception occurs before the electronic device accesses the operating system, and consequently a blue screen appears and then the electronic device shuts down. In the embodiment of this application, abnormal shutdown scenarios include but are not limited to the two scenarios described above.

According to a second aspect, an embodiment of this application provides an electronic device. The electronic device includes one or more processors, one or more memories, one or more communications interfaces, and one or more touchscreens. The memory and the communications interface are coupled to the processor. The touchscreen is configured to display an image generated by the processor. The memory is configured to store computer program code, and the computer program code includes a computer instruction. When the processor executes the computer instruction, the processor is configured to obtain a quantity of abnormal shutdowns of the electronic device at a BIOS boot stage of the electronic device. The processor is further configured to control the touchscreen to display a first interface when the quantity of abnormal shutdowns of the electronic device is greater than or equal to a preset threshold, where the first interface includes a first system recovery mechanism option. The processor is further configured to receive a selection operation on the first system recovery mechanism option through the communications interface, and run the first system recovery mechanism in response to the selection operation on the first system recovery mechanism option.

In a first optional implementation of the second aspect, the foregoing processor is further configured to obtain advanced startup indication information of the electronic device, where the advanced startup indication information is used to instruct the processor to run a second system recovery mechanism.

In a second optional implementation of the second aspect, the foregoing first interface further includes at least one of the following: a second system recovery mechanism option, a startup-continued option, and a shutdown and restart option. The foregoing processor is further configured to receive a selection operation on the second system recovery mechanism option through the communications interface, and run the second system recovery mechanism in response to the selection operation on the second system recovery mechanism option.

In a third optional implementation of the second aspect, the foregoing processor is further configured to: at the BIOS boot stage of the electronic device, if a user manually presses a first system recovery hot key, control the touchscreen to display a second interface, where the second interface includes a first system recovery mechanism option and a shutdown and restart option; the foregoing processor is further configured to: receive a selection operation on the first system recovery mechanism option, and run the first system recovery mechanism in response to the selection operation on the first system recovery mechanism option.

In a fourth optional implementation of the second aspect, the foregoing processor is further configured to: increase the quantity of abnormal shutdowns by 1 during the startup of the electronic device; and during subsequent running of the electronic device, if the electronic device shuts down normally, clear the quantity of abnormal shutdowns, or if the electronic device shuts down abnormally, skip clearing the quantity of abnormal shutdowns.

In a fifth optional implementation of the second aspect, the foregoing processor is further configured to: obtain a status of an EC at the BIOS boot stage of the electronic device, where the status of the EC indicates whether there is a shutdown event triggered by a watchdog mechanism in the electronic device; and if there is a shutdown event triggered by the watchdog mechanism in the electronic device, reduce the quantity of abnormal shutdowns obtained by the processor at the BIOS boot stage by 1.

In a sixth optional implementation of the second aspect, the foregoing first system recovery mechanism is a system recovery mechanism customized by an OEM, and the second system recovery mechanism is a default system recovery mechanism of Windows.

In a seventh optional implementation of the second aspect, the foregoing abnormal shutdown of the electronic device includes at least one of the following: a forcible shutdown, and a shutdown of the electronic device after a blue screen appears.

According to a third aspect, an embodiment of this application provides a computer storage medium. The computer storage medium includes a computer instruction, and when the computer instruction runs on an electronic device, the electronic device is enabled to perform the system recovery method according to any one of the first aspect and its various optional implementations.

According to a fourth aspect, an embodiment of this application provides a computer program product. When the computer program product runs on a computer, the computer is enabled to perform the system recovery method according to any one of the first aspect and its various optional implementations.

For technical effects brought by the terminal according to the second aspect and its optional implementations, the computer storage medium according to the third aspect, and the computer program product according to the fourth aspect, refer to the technical effects brought by the first aspect and its optional implementations. Details are not described herein again.

BRIEF DESCRIPTION OF DRAWINGS

FIG. 5A, FIG. 5B and FIG. 5C are schematic diagram 2 of a system recovery method according to an embodiment of this application;

DESCRIPTION OF EMBODIMENTS

Figure 1:
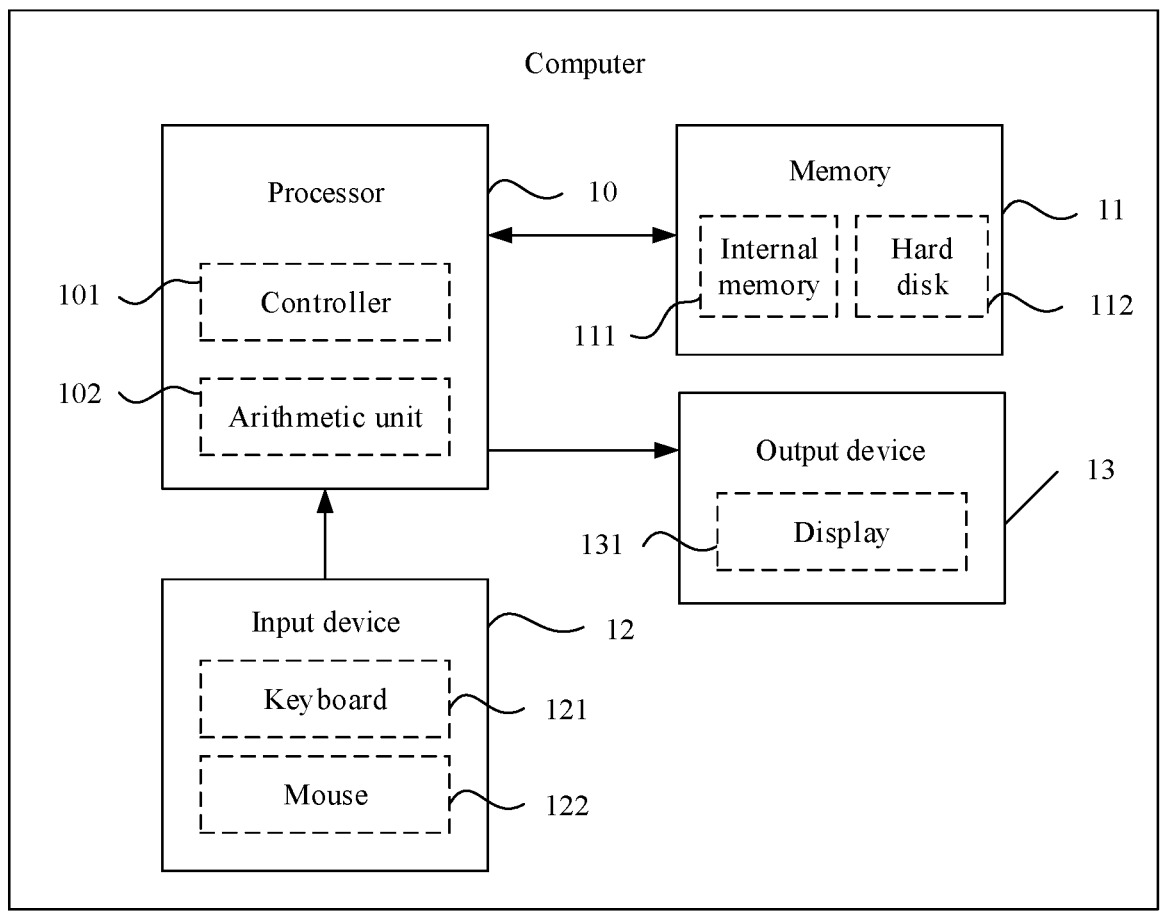
FIG. 1 is a schematic diagram of hardware of a computer according to an embodiment of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and so on are intended to distinguish between different objects but do not indicate a particular order of the objects. For example, the first system recovery mechanism and the second system recovery mechanism are used to distinguish different system recovery mechanisms, rather than to describe a particular order of the system recovery mechanisms.

In the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "example" or the like is intended to present a relative concept in a specific manner.

In the description of the embodiment of this application, unless otherwise stated, "multiple" means two or more than two. For example, a plurality of processing units refer to two or more processing units; a plurality of systems refer to two or more systems.

Some concepts used in the system recovery method and apparatus provided in the embodiments of this application are first explained and described.

For example, the electronic device is a computer. A startup process of the computer includes a basic input output system (BIOS) boot and an operating system (OS) startup. After the computer is powered on, a BIOS boot stage is entered first, and after the BIOS boot is completed, the OS startup begins.

Basic input output system (BIOS): a group of programs that are permanently written into a read only memory (ROM) chip on a motherboard of the computer. The BIOS stores the most important basic input and output programs, system setting information, a power-on self-test program, and a system self-start program. The main function of the BIOS is to provide the most direct underlying hardware setting and control for the computer.

Operating system: a set of system software that manages computer hardware resources, controls operation of other programs, and provides a user with an interactive operation interface. The operating system is a key component of a computer system, and is responsible for basic tasks such as managing and configuring a memory, determining a priority of system resource supply and demand, controlling input and output devices, operating a network, and managing a file system. There are many types of operating systems, and operating systems installed on various devices may range from simple to complex operating systems, and range from an embedded operating system of a mobile phone to a large operating system of a supercomputer. Common operating systems mainly include Android, iOS, Linux, Windows, Mac OS X, and the like.

Abnormal shutdown: In a Windows system, a normal shutdown process requires execution of three steps: soft protection, hard protection, and power-off. Soft protection refers to closing all application programs of the user, saving system settings of the user, and stopping system services. Hard protection refers to stopping a hardware driver. Power-off is the last step.

Abnormal shutdown is a shutdown phenomenon that does not comply with the foregoing shutdown process. Scenarios of abnormal shutdown may include forcible shutdown manually performed by the user or shutdown performed when a blue screen appears on the computer. Specifically, the scenario of forcible shutdown manually performed by the user may include shutdown of the electronic device due to direct power-off (for example, power-off by pressing and holding the power button); shutdown performed when a blue screen appears on the computer may include an automatic restart process when an exception occurs before the electronic device accesses the operating system, and consequently a phenomenon such as a blue screen appears. In the embodiment of this application, abnormal shutdown scenarios include but are not limited to the two scenarios described above.

Shutdown triggered by the watchdog mechanism: A watchdog is a protection mechanism. A working principle of the watchdog is actually equivalent to a timer circuit. In the computer, the processor outputs a signal to an input end (that is, a watchdog resetting end) of the watchdog within a specific time period so that the watchdog circuit is cleared. If no signal is output to the watchdog within the specified time period, the watchdog generates a system reset, that is, shuts down and restarts the computer. In general, the watchdog can prevent a program from running without restrictions, avoiding an endless loop or program suspension.

To resolve the problems described in the BACKGROUND section, embodiments of this application provide a system recovery method and apparatus, so as to: obtain a quantity of abnormal shutdowns of an electronic device at a BIOS boot stage of the electronic device; when the quantity of abnormal shutdowns of the electronic device is greater than or equal to a preset threshold, display a first interface that includes a first system recovery mechanism option; receive a selection operation on the first system recovery mechanism option; and run the first system recovery mechanism in response to the selection operation on the first system recovery mechanism option, thereby implementing system recovery of the electronic device.

The electronic device provided in the embodiments of this application may be an electronic device with an operating system, for example, the electronic device may be a computer (such as a desktop computer, a tablet computer, a notebook computer, or an ultra-mobile personal computer (UMPC)), a mobile phone, a netbook, a personal digital assistant (PDA), an intelligent car, a sensing device, an Internet of things (IOT) device, customer premise equipment (CPE), or the like.

For example, a hardware structure of the electronic device is described by using an example in which the electronic device is a computer. As shown in FIG. 1, a computer provided in an embodiment of this application includes components such as a processor 10, a memory 11, an input device 12, and an output device 13. A person skilled in the art may understand that a structure of the computer shown in FIG. 1 does not constitute a limitation on the computer, and the computer may include more or fewer components than those shown in FIG. 1, or may include a combination of some of the components shown in FIG. 1, or may include components arranged differently from those shown in FIG. 1.

Processor 10: a core component of the computer. The processor 10 may be a central processing unit (CPU). In a microcomputer (referred to as a microcomputer or a personal computer), the CPU is also referred to as a microprocessor. The processor mainly includes a controller 101 and an arithmetic unit 102.

The controller 101 is a structure for explaining and executing an instruction in the computer. A main function of the controller 101 is to control coordinated working of components such as the arithmetic unit 102, the memory 11, the input device 12, and the output device 13. During working, the controller 101 fetches an instruction from the memory 11 and points out a storage address of a next instruction, and then analyzes the fetched instruction and generates a corresponding control signal. The control signal is used to start related components so that these components complete an operation specified by the instruction. In this way, by executing programs that include a series of instructions one by one, the computer can automatically complete a predetermined task according to requirements of the program.

A main function of the arithmetic unit 102 is to perform operations such as arithmetic operations, logical operations, and logical judgments on data. Under control of the controller 101, the arithmetic unit 102 performs a corresponding operation on data fetched from the memory 11 or an internal register of the arithmetic unit 102 according to instruction code, and temporarily stores a result in the internal register of the arithmetic unit 102 or sends the result to the memory 11.

Memory 11: a component used to store a program and data, and an important part of the computer. The memory 11 may include an internal memory 111 and a hard disk 112. The internal memory 111 includes high-speed semiconductor memory chips, and is a place at which a program and data are temporarily stored during running of the computer. During running of the computer, data to be processed is first transferred from the hard disk 112 to the internal memory 111, and then transferred from the internal memory 111 to the processor 10. After processing performed by the processor 10 is completed, the data is sent to the internal memory 111 and finally stored in the hard disk 112.

The internal memory 111 may include a random access memory (RAM), a ROM, and a cache memory (Cache). Data in the RAM can be read or written randomly, and the RAM is used to store the program and related data transferred from the hard disk 112 and the data sent from the processor 10. The generally known internal memory actually refers to the RAM. It should be noted that after the computer is powered off, the data in the RAM is completely lost. The ROM is a quite small part of the internal memory. The ROM usually stores some fixed and dedicated programs or data, and the processor 10 only performs reading on the ROM. The cache has a relatively small storage capacity, but its speed is much higher than that of the RAM, and is close to a speed of the CPU. In a hierarchical structure of a computer storage system, the cache is a high-speed and small-capacity memory between the CPU and the RAM.

Input device 12: used to input a program and raw data (including a text, a graph, an image, a sound, and the like) to be processed into the computer. The input device 12 on the computer may include a keyboard 121 and a mouse 122.

The keyboard 121 is a most basic input device in the computer. Alphabet keys, number keys, symbol keys, and the like are arranged on the keyboard. Through key operations, information such as a command, a program, and data can be input into the computer. The mouse 122 is an auxiliary input device in the computer. The mouse 122 is a pointing "device" with two or three buttons on the surface. The mouse can be used to perform operations such as clicking, double-clicking, and dragging on an operation object. The mouse 122 may include a wired mouse and a wireless mouse.

Optionally, the input device 131 of the computer may further include a scanner, a handwriting tablet, and the like.

Output device 13: used to output a result of computer running or data processing. The output device 13 may include a display 131. The display 131 is a most basic output device of the computer and a main tool for man-machine interaction. The computer provides a user with various application software operation interfaces through the display, and the user can input data, select various functions, learn a result of program running, and so on through these interfaces.

The display 131 may be a touch display, and the display 131 includes a display panel and a touchscreen. Optionally, the display panel may be configured in a form such as a liquid crystal display (LCD) or an organic light-emitting diode (OLED). Further, the touchscreen may cover the display panel. After detecting a touch operation performed on or near the touchscreen, the touchscreen sends the touch operation to the processor 10 to determine a type of a touch event, and then the processor 10 provides corresponding visual output on the display panel based on the type of the touch event. The touchscreen and the display panel are used as two independent components to implement input and output functions of the computer. However, in some embodiments, the touchscreen and the display panel may be integrated to implement the input and output functions of the computer.

Optionally, the foregoing output device 13 may further include a printer, a plotter, and the like.

Optionally, the computer provided in the embodiment of this application may further include a modem, a fan, a power supply, a network interface card, an audio card, a Wi-Fi module, a Bluetooth module, and the like.

The computer provided in the embodiment of this application further includes a software system. The software system includes system software and application software, and the system software includes an operating system (OS).

Figure 2:
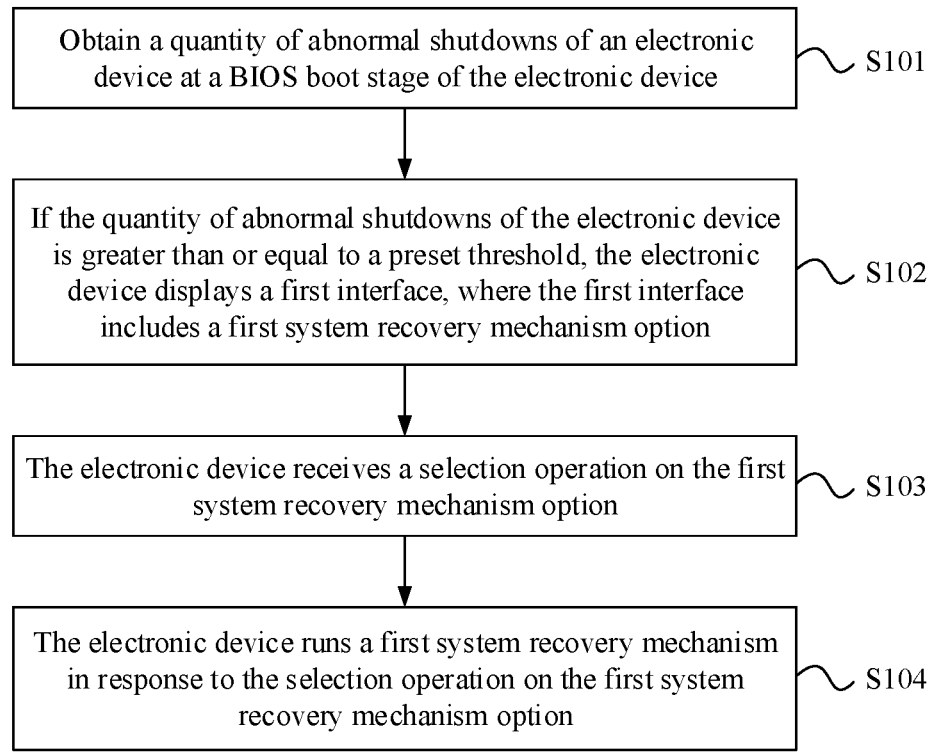
FIG. 2 is a schematic diagram 1 of a system recovery method according to an embodiment of this application.

Based on the foregoing descriptions of the various components of the electronic device, an embodiment of this application provides a system recovery method. As shown in FIG. 2, the method may include S101-S104.

S101: Obtain a quantity of abnormal shutdowns of an electronic device at a BIOS boot stage of the electronic device.

The foregoing abnormal shutdown of the electronic device includes at least one of the following: a forcible shutdown, and a shutdown of the electronic device after a blue screen appears. The abnormal shutdown of the electronic device may further include another phenomenon that causes the electronic device to shut down. This is not specifically limited in the embodiment of this application.

In the embodiment of this application, in memory space of the BIOS, 1-byte (that is, 8-bit) storage space in the flash memory in the BIOS is used to store indication information (which may alternatively be understood as a flag bit) related to the system recovery method for the electronic device, which may be referred to as a system restoration flag. In the following embodiments, the system restoration flag is denoted as a BIOS Flash Flag. Specifically, some bits in the BIOS Flash Flag may be used to indicate the quantity of abnormal shutdowns. In this way, during power-on of the electronic device, at the BIOS boot stage, the quantity of abnormal shutdowns of the electronic device can be obtained by reading corresponding bits in the BIOS Flash Flag.

Figure 3:
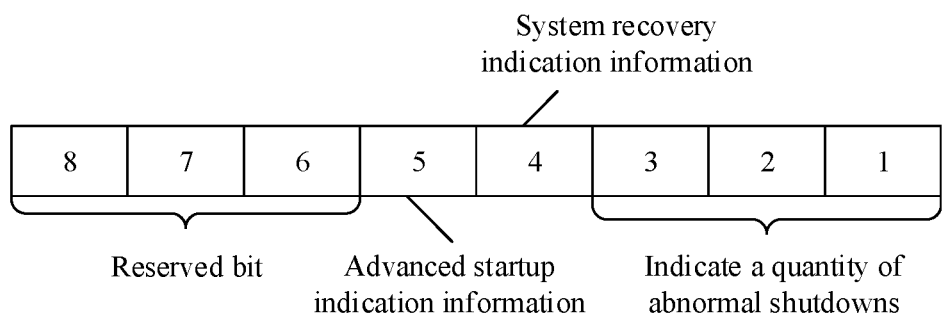
FIG. 3 is a schematic diagram of each piece of indication information according to an embodiment of this application.

For example, as shown in FIG. 3, for the foregoing BIOS Flash Flag, in a right-to-left direction, the first three bits (that is, the three least-significant bits) of the BIOS Flash Flag are used to indicate the quantity of abnormal shutdowns, and are denoted as Flag[3:0]. A binary number represented by the three least-significant bits of the BIOS Flash Flag may be the quantity of abnormal shutdowns. For example, Table 1 below shows an example of a relationship between a value of the three least-significant bits of the BIOS Flash Flag and the quantity of abnormal shutdowns.

TABLE 1

| Value of the three least-significant bits | Quantity of abnormal shutdowns |
|---|---|
| 000 | 0 |
| 001 | 1 |
| 010 | 2 |
| 011 | 3 |
| 100 | 4 |
| 101 | 5 |
| 110 | 6 |
| 111 | 7 |

It should be noted that, in the embodiment of this application, the quantity of abnormal shutdowns described above is an accumulated value. Specifically, during startup of the electronic device, after the BOIS boot is completed and loading of the operating system is completed, the operating system can call back an advanced configuration and power interface (ACPI). By calling back the ACPI, the operating system can obtain a management permission of the electronic device, so that the BIOS transfers the management permission of the electronic device to the operating system in response to the ACPI callback performed by the operating system. In addition, the BIOS increases the quantity of abnormal shutdowns by 1, that is, increases the value of the three least-significant bits in the BIOS Flash Flag by 1. During subsequent running of the electronic device, if the electronic device shuts down normally, the quantity of abnormal shutdowns is cleared; if the electronic device shuts down abnormally, the quantity of abnormal shutdowns is not cleared. In this case, it can be seen that when the electronic device shuts down abnormally, the quantity of abnormal shutdowns of the electronic device is accumulated.

S102: If the quantity of abnormal shutdowns of the electronic device is greater than or equal to a preset threshold, the electronic device displays a first interface, where the first interface includes a first system recovery mechanism option.

In the embodiment of this application, the foregoing first system recovery mechanism option corresponds to a first system recovery mechanism, and the first system recovery mechanism may be a system recovery mechanism customized by an original equipment manufacturer (OEM).

It should be noted that the foregoing preset threshold may be set according to actual use requirements (for example, set to 3), which is not specifically limited in the embodiment of this application.

S103: The electronic device receives a selection operation on the first system recovery mechanism option.

In the embodiment of this application, when the display screen of the electronic device is a touchscreen, the foregoing selection operation on the first system recovery mechanism may be a pressing operation, a touching and holding operation, a sliding operation, a tapping operation, a floating operation (an operation of the user near the touchscreen), or the like on the touchscreen of the electronic device triggered by a finger or a stylus.

Optionally, the foregoing selection operation on the first system recovery mechanism option may also be a key operation. For example, the key operation corresponds to an operation such as a tapping operation, a double-tapping operation, a touching and holding operation, or a combined-key operation on a key such as a power key, a volume key, or an Enter key on the keyboard of the electronic device.

S104: The electronic device runs the first system recovery mechanism in response to the selection operation on the first system recovery mechanism option.

In the embodiment of this application, that the electronic device runs the first system recovery mechanism means that the electronic device runs a system recovery program corresponding to the first system recovery mechanism, so that the system of the electronic device is restored to the state of factory settings.

Figure 4:
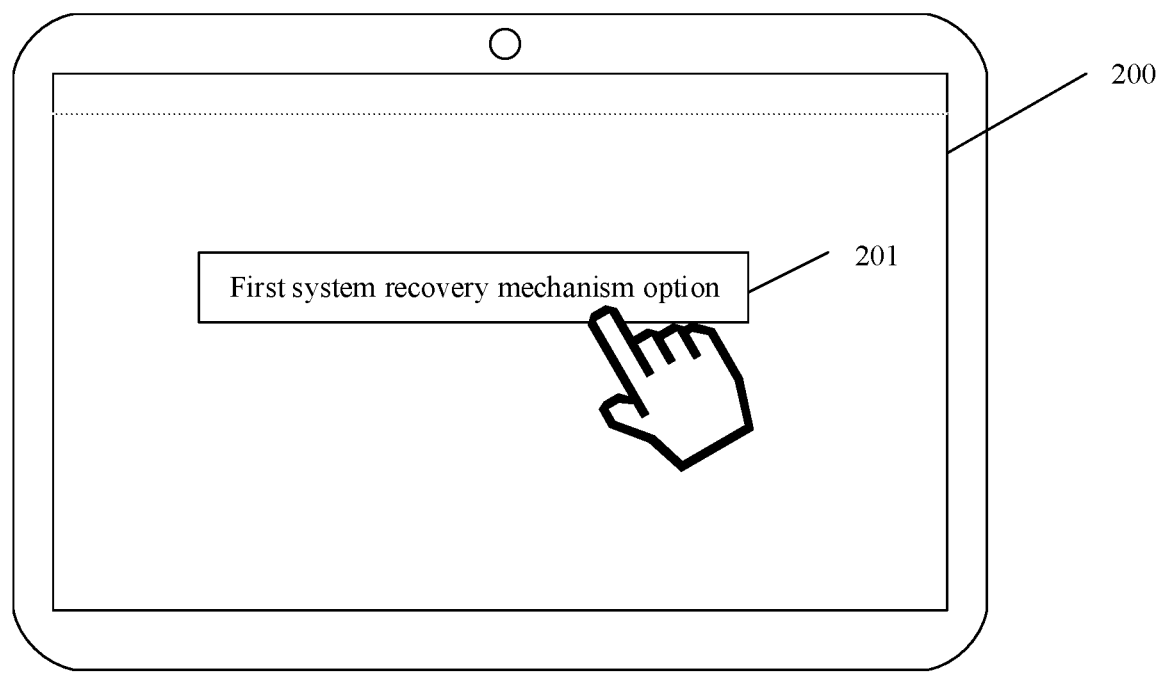
FIG. 4 is a schematic diagram 1 of an example of a display interface of an electronic device according to an embodiment of this application.

For example, the electronic device is a computer. As shown in FIG. 4, when the quantity of abnormal shutdowns of the computer is greater than or equal to a preset threshold (for example, 3), the computer displays a first interface 200. The first interface 200 includes a first system recovery mechanism option 201, and the user can select (for example, click) the first system recovery mechanism option 201, so that the computer responds accordingly.

In the system recovery method provided in the embodiment of this application, at the BIOS boot stage during startup of the electronic device, when the quantity of abnormal shutdowns of the electronic device is greater than or equal to the preset threshold, the user can be guided in selecting a system recovery mechanism (for example, the foregoing first system recovery mechanism) according to needs, so that the electronic device runs the system recovery mechanism. In this way, the user can be more smoothly guided in implementing system recovery of the electronic device.

Figure 5A:
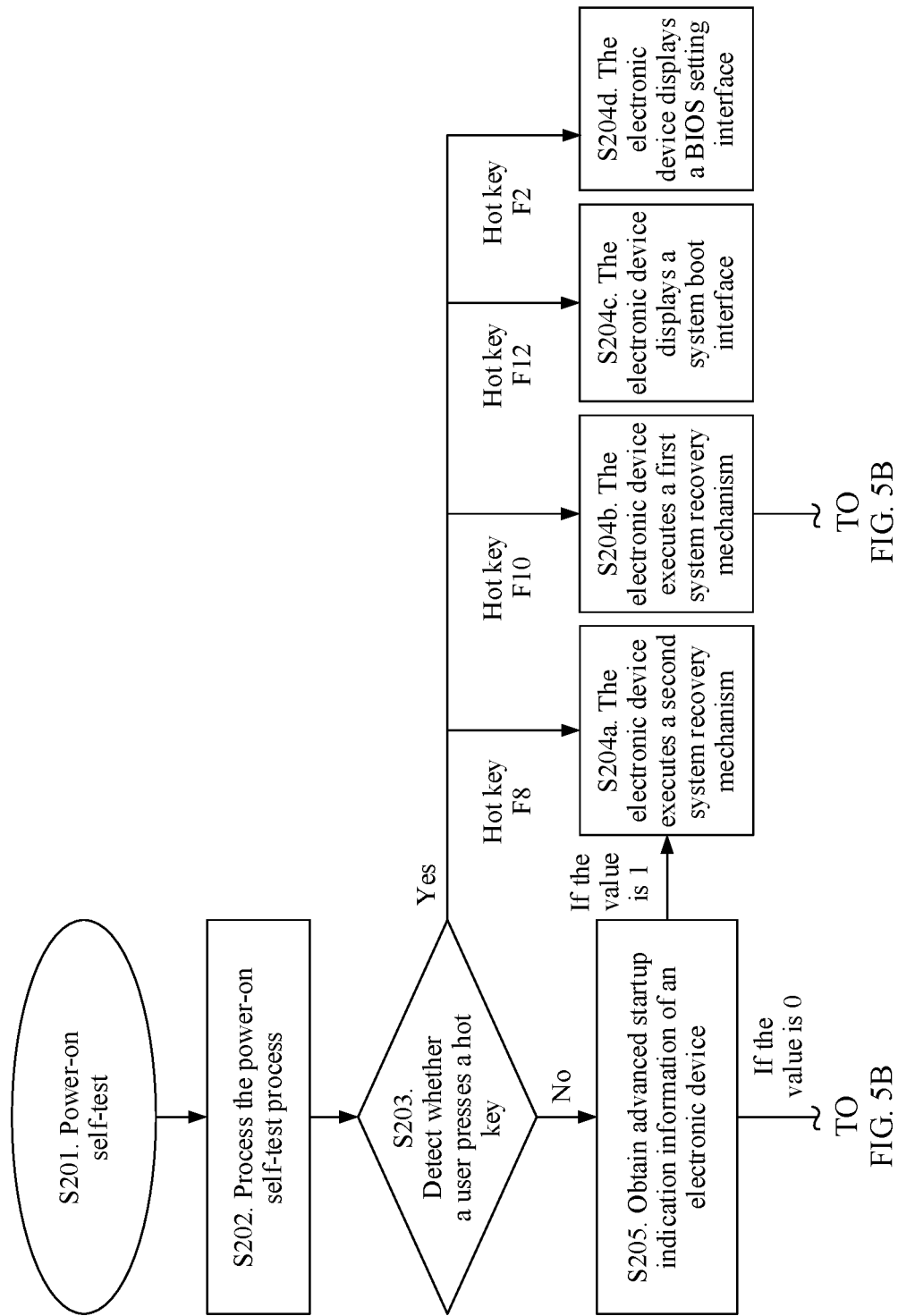
Figure 5C:
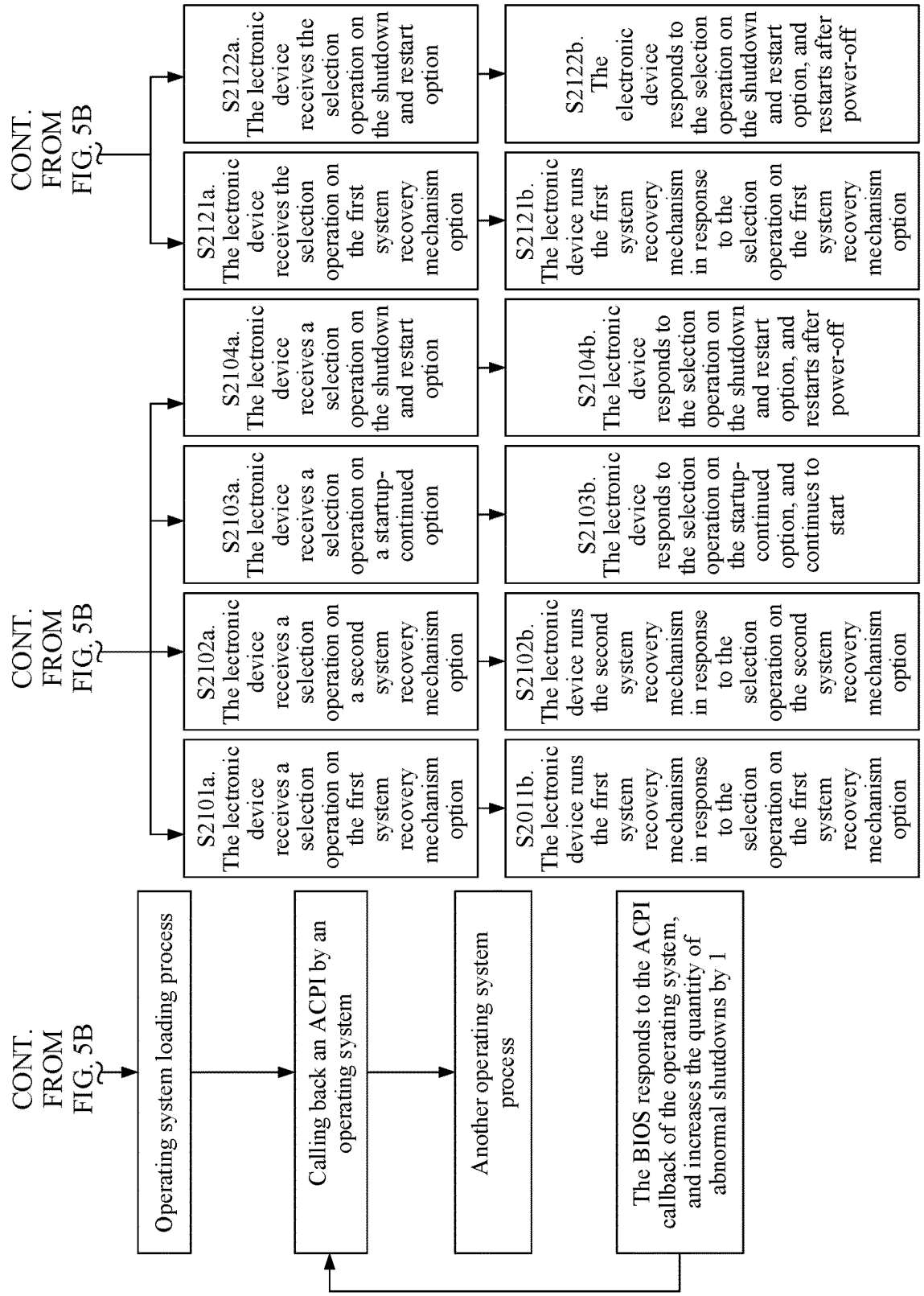

The following describes in detail the system recovery method provided in the embodiment of this application from the perspective of a complete startup process of the electronic device. As shown in FIG. 5A, FIG. 5B and FIG. 5C, the method may include the following steps:

S201: Perform power-on self-test.

S202: Process the power-on self-test process.

In the embodiment of this application, when the electronic device is started (for example, the user presses a start button), the BIOS boot is first performed, that is, the electronic device starts self-test.

S203: Detect whether the user presses a hot key.

In the embodiment of this application, during power-on of the electronic device, detecting that the user presses a specific hot key (for example, F8 or F10) is equivalent to inputting a specific instruction to the electronic device. Then, the electronic device responds to the instruction and performs a corresponding operation.

For example, when the user presses the hot key F8, the following S204a can be performed:

S204a: The user presses the hot key F8, and the electronic device executes a second system recovery mechanism.

In the embodiment of this application, during power-on of the electronic device, pressing the hot key F8 corresponds to the operation of executing the second system recovery mechanism by the electronic device to implement system recovery.

The foregoing second system recovery mechanism may be a default system recovery mechanism of Windows (which may be referred to as WinRE for short), or the second system recovery mechanism may also be another type of system recovery mechanism, which is not specifically limited in the embodiment of this application.

Optionally, in the embodiment of this application, after the electronic device enters the second system recovery mechanism, and completes the system recovery of the electronic device, if the electronic device can shut down normally, the quantity of abnormal shutdowns is cleared, that is, the three least-significant bits of the BOIS Flash Flag are reset. For example, if "0" indicates resetting, the three least-significant bits of the BIOS Flash Flag are all cleared.

When the user presses the hot key F10, the following S204b can be performed:

S204b: The user presses the hot key F10, and the electronic device executes a first system recovery mechanism.

In the embodiment of this application, during power-on of the electronic device, pressing the hot key F10 corresponds to the operation of executing the first system recovery mechanism by the electronic device to implement system recovery. The first system recovery mechanism is different from the foregoing second system recovery mechanism. For example, the first system recovery mechanism may be a system recovery mechanism customized by an OEM.

Similarly, optionally, in the embodiment of this application, after the electronic device enters the first system recovery mechanism, and completes the system recovery of the electronic device, if the electronic device can shut down normally, the quantity of abnormal shutdowns is cleared, that is, the electronic device clears the three least-significant bits of the BOIS Flash Flag.

The system recovery performed by the electronic device in S204a or S204b is a result of an active operation of the user, not a result of automatically (or spontaneously) guiding, by the electronic device, the user in making a selection.

When the user presses the hot key F12, the following S204c can be performed:

S204c: The user presses the hot key F12, and the electronic device displays a system boot interface.

In the embodiment of this application, after the user presses the hot key F12, the electronic device can display the system boot interface, so that the user can perform a related operation on the boot interface to enter a designated system.

When the user presses the hot key F2, the following S204d can be performed:

S204d: The user presses the hot key F2, and the electronic device displays a BIOS setting interface.

In the embodiment of this application, after the user presses the hot key F2, the electronic device can display the BIOS setting interface, so that some BIOS switches can be set in this interface.

In the embodiment of this application, if it is detected that the user does not press any hot key, the following S205 and subsequent related steps are performed:

S205. Obtain advanced startup indication information of the electronic device.

The advanced startup indication information instructs the electronic device to run a second system recovery mechanism.

In the embodiment of this application, as shown in FIG. 3, the fifth bit (in a right-to-left direction) of the foregoing BIOS Flash Flag can be defined as advanced startup indication information, and is denoted as Flag[5]. The obtaining the advanced startup indication information of the electronic device described above specifically includes: reading the fifth bit of the BOIS Flash Flag, that is, Flag[5] at the BIOS boot stage.

Optionally, in the embodiment of this application, an identifier "1" may be used to instruct the electronic device to run the second system recovery mechanism, or an identifier "0" may be used to instruct the electronic device to run the second system recovery mechanism. Specifically, selection may be made based on an actual use requirement. This is not limited in the embodiment of this application.

For example, if the foregoing advanced startup indication information is 1, it instructs the electronic device to run the second system recovery mechanism. When the advanced startup indication information is 0, it instructs the electronic device to obtain the quantity of abnormal shutdowns. Table 2 below shows an example of a relationship between the advanced startup indication information and a meaning indicated by the advanced startup indication information.

TABLE 2

| Advanced startup indication information | Meaning |
| --- | --- |
| 1 | Runs the second system recovery mechanism |
| 0 | Obtains the quantity of abnormal shutdowns |

As shown in FIG. 5A, FIG. 5B and FIG. 5C, in the embodiment of this application, if the foregoing advanced startup indication information is "1", the electronic device runs the foregoing second system recovery mechanism (that is, WinRE); if the foregoing advanced startup indication information is "0", the following S206 is performed:

S206: Obtain the quantity of abnormal shutdowns of the electronic device.

In the embodiment of this application, at the BIOS boot stage, the three least-significant bits in the BOIS Flash Flag, that is, Flag[3:0] are read, and the quantity of abnormal shutdowns of the electronic device can be known with reference to Table 1 in S101.

It should be emphasized that in the embodiment of this application, at the BIOS boot stage of the electronic device, a status of an embedded controller (EC) can be obtained, and the status of the EC indicates whether there is a shutdown event triggered by a watchdog mechanism in the electronic device.

If there is a shutdown event triggered by the watchdog mechanism in the electronic device, the quantity of abnormal shutdowns obtained by the electronic device at the BIOS boot stage is reduced by 1 to obtain a new quantity of abnormal shutdowns. Then, it is determined, based on the new quantity of abnormal shutdowns, whether the electronic device needs to perform system recovery. If there is no shutdown event triggered by a watchdog mechanism in the electronic device, it is determined, directly based on the obtained quantity of abnormal shutdowns, whether the electronic device needs to perform system recovery.

In the embodiment of this application, when the watchdog mechanism in the electronic device triggers the electronic device to shut down, actually, the shutdown phenomenon is not regarded as an abnormal shutdown, but as a normal shutdown. However, during internal implementation of the electronic device, when the watchdog mechanism triggers the electronic device to shut down, the quantity of abnormal shutdowns described above also increases by 1, and the EC of the electronic device records (which can also be understood that the EC perceives) this event (that is, the shutdown event triggered by the watchdog mechanism). Therefore, during next startup of the electronic device, at the BIOS boot stage, the status of the EC is queried. In addition, when it is determined, based on the status of the EC, that there is a shutdown event triggered by a watchdog in the electronic device, the obtained quantity of abnormal shutdowns is reduced by 1 to obtain a true value of the quantity of abnormal shutdowns.

It should be noted that, for an event that the watchdog mechanism triggers the electronic device in a sleep state to shut down, the electronic device clears the quantity of abnormal shutdowns described above (in other words, the quantity of abnormal shutdowns of the electronic device is not accumulated), and the EC does not record (that is, the EC does not perceive) this shutdown event triggered by the watchdog.

S207: The electronic device determines whether the quantity of abnormal shutdowns is greater than or equal to a preset threshold.

In an implementation, when the quantity of abnormal shutdowns of the electronic device is less than the preset threshold, the electronic device continues to start according to a normal startup process. As shown in FIG. 5A, FIG. 5B and FIG. 5C, the electronic device continues to run a power-on self-test process, an operating system loading process, a process of calling back an ACPI by an operating system, and a process of responding to the ACPI callback of the operating system by the BIOS, and increases the quantity of abnormal shutdowns by 1 (for example, when the quantity of abnormal shutdowns is less than or equal to 15, the quantity of abnormal shutdowns is increased by 1), and then executes another operating system process.

With reference to the related description in S101, during the subsequent running of the electronic device, if the electronic device shuts down normally, the foregoing quantity of abnormal shutdowns is cleared. If the electronic device shuts down abnormally, the value of the foregoing quantity of abnormal shutdowns is not cleared, that is, the quantity of abnormal shutdowns is accumulated.

In another implementation, when the quantity of abnormal shutdowns of the electronic device is greater than or equal to the preset threshold, system recovery indication information is set, where the system recovery indication information is used to instruct the electronic device to display the first interface.

In the embodiment of this application, as shown in FIG. 3, the fourth bit (in a right-to-left direction) of the BIOS Flash Flag can be defined as system recovery indication information, and is denoted as Flag[4]. The system recovery indication information is used to instruct the electronic device to display the first interface, so that the user can perform corresponding operations in the first interface according to needs, and then the electronic device responds differently.

Optionally, as shown in FIG. 3, other bits (such as the three most-significant bits) in the BIOS Flash Flag may be used as reserved bits.

Optionally, in the embodiment of this application, an identifier "1" may be used to instruct the electronic device to display the first interface, or an identifier "0" may be used to instruct the electronic device to display the first interface.

Specifically, selection may be made based on an actual use requirement. This is not limited in the embodiment of this application.

For example, if the foregoing system recovery indication information is "1", it instructs the electronic device to display the first interface; if the system recovery indication information is "0", it instructs the electronic device to display a second interface, where the first interface is different from the second interface. Table 3 below shows an example of a relationship between the system recovery indication information and a meaning indicated by the system recovery indication information.

TABLE 3

| System recovery indication information | Meaning |
| --- | --- |
| 1 | Displays the first interface |
| 0 | Displays the second interface |

It should be noted that in the embodiment of this application, the foregoing action of determining whether the quantity of abnormal shutdowns of the electronic device is greater than or equal to the preset threshold is an action within the BIOS. When the BIOS determines whether the quantity of abnormal shutdowns is greater than or equal to the preset threshold, this event needs to be notified to a restoration application. Therefore, the electronic device sets the system recovery indication information (for example, sets Flag[4] to 1), so that the restoration application runs the system recovery mechanism customized by an OEM according to the system recovery indication information. A specific implementation is setting the system recovery indication information of the electronic device to a first identifier, that is, setting Flag[4] to the first identifier.

In the embodiment of this application, when the quantity of abnormal shutdowns of the electronic device is greater than or equal to the preset threshold, after the system recovery indication information of the electronic device is set, the following S208 is further performed:

S208: Obtain the system recovery indication information of the electronic device.

In the embodiment of this application, obtaining the system recovery indication information at the BIOS boot stage specifically includes: reading the fourth bit (from right to left) in the BOIS Flash Flag, that is, Flag[4].

For the description of the system recovery indication information, refer to the detailed description of the system recovery indication information in S207. Details are not described herein again.

In the embodiment of this application, for example, when the system recovery indication information is 1, it instructs the electronic device to display the first interface, and when the system recovery indication information is 0, it instructs the electronic device to display the second interface. If the system recovery indication information is 1, related steps such as S209 are performed.

S209: The electronic device displays the first interface, where the first interface includes a first system recovery mechanism option.

Optionally, in the embodiment of this application, the foregoing first interface may further include at least one of the following options: a second system recovery mechanism option, a startup-continued option, and a shutdown and restart option. The electronic device displays the first interface, and the first interface displays different options. The user can perform a related operation in the first interface, that is, an operation of selecting a specific option according to needs.

Figure 6:
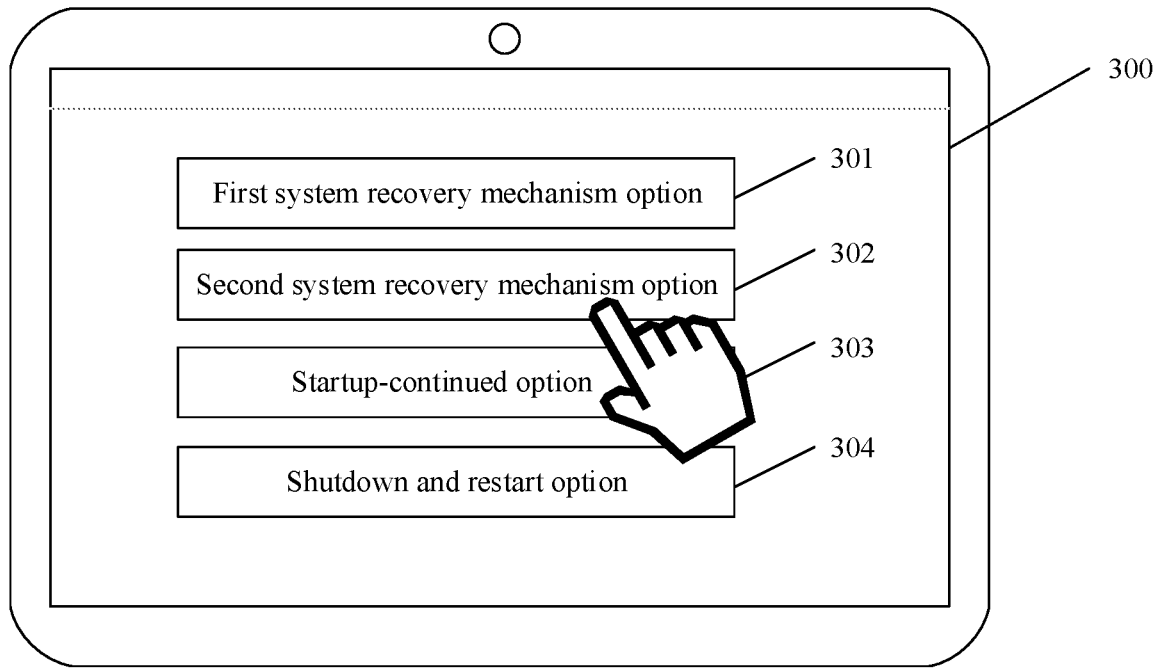
FIG. 6 is a schematic diagram 2 of an example of a display interface of an electronic device according to an embodiment of this application.

For example, the electronic device is a computer, and the first interface includes the first system recovery mechanism option, the second system recovery mechanism option, the startup-continued option, and the shutdown and restart option. As shown in FIG. 6, when the quantity of abnormal shutdowns of the computer is greater than or equal to the preset threshold (for example, 3), the computer displays a first interface 300. The first interface 300 includes the first system recovery mechanism option 301, the second system recovery mechanism option 302, the startup-continued option 303, and the shutdown and restart option 304. The user can select (for example, click) any one (for example, select the second system recovery mechanism option 302) of the foregoing four options according to needs.

If the user selects the first system recovery mechanism option, the following S2101*a* and S2101*b* are performed:

S2101*a*: The electronic device receives a selection operation on the first system recovery mechanism option.

S2011*b*: The electronic device runs the first system recovery mechanism in response to the selection operation on the first system recovery mechanism option.

It should be noted that, in the embodiment of this application, the electronic device performs S2101*a* and S2101*b*, and the electronic device completes the system recovery. During subsequent running of the electronic device, if the electronic device shuts down normally, the three least-significant bits (including Flag[3:0]) of the BIOS Flash Flag are reset, that is, cleared.

For other descriptions of S2101*a* and S2101*b*, refer to related descriptions of S103 and S104. Details are not described herein again.

If the user selects the second system recovery mechanism option, the following S2102*a* and S2102*c* are performed:

S2102*a*: The electronic device receives a selection operation on the second system recovery mechanism option.

S2102*b*: The electronic device runs the second system recovery mechanism in response to the selection operation on the second system recovery mechanism option.

In the embodiment of this application, that the electronic device runs the second system recovery mechanism in response to the selection operation on the second system recovery mechanism option specifically includes: the electronic device sets the advanced startup indication information of the electronic device (for example, sets Flag[5] to 1), and then the electronic device restarts, that is, the electronic device performs the steps starting from S201 again. It can be understood that when the electronic device performs S205, that is, when the electronic device obtains the advanced startup indication information, because the advanced startup indication information has been set to 1 before the restart, the electronic device runs the second system recovery mechanism under the instruction of the advanced startup indication information to implement the system recovery of the electronic device.

Similarly, the electronic device executes the second system recovery mechanism and completes the system recovery. During subsequent running of the electronic device, if the electronic device shuts down normally, the electronic device resets, that is, clears the three least-significant bits of the BOIS Flash Flag.

In the embodiment of this application, the foregoing first system recovery mechanism is a system recovery mechanism customized by an OEM, and the second system recovery mechanism is a default system recovery mechanism of Windows. In comparison with the default system recovery option of Windows, using the system recovery mechanism customized by an OEM to perform system recovery has advantages of high speed and good commonality.

If the user selects the startup-continued option, the following S2103a and S2103b are performed:

S2103a: The electronic device receives a selection operation on the startup-continued option.

S2103b: The electronic device responds to the selection operation on the startup-continued option, and continues to start.

In the embodiment of this application, that the electronic device continues to start means that the electronic device continues to start according to a normal startup process. For details, refer to related description in S207. When the electronic device continues to start, the electronic device may start smoothly, or the electronic device may not start smoothly.

If the user selects the shutdown and restart option, the following S2104a and S2104b are performed:

S2104a: The electronic device receives a selection operation on the shutdown and restart option.

S2104b: The electronic device responds to the selection operation on the shutdown and restart option, and restarts after power-off In the embodiment of this application, when the electronic device is powered off, if the electronic device shuts down normally, the three least-significant bits (including Flag[3: 0]) of the BIOS Flash Flag are reset, that is, cleared. The electronic device restarts after power-off, that is, the electronic device starts to perform various actions starting from S201 again.

Optionally, at the BIOS boot stage of the electronic device, if the user manually presses the first system recovery hot key (that is, the F10 hot key), the electronic device further needs to perform the foregoing S208 (of obtaining the system recovery indication information of the electronic device).

In the embodiment of this application, if the system recovery indication information is 0, related steps such as S211 are performed.

S211: The electronic device displays the second interface, where the second interface includes the first system recovery mechanism option and the shutdown and restart option.

The electronic device displays the second interface, and the user can perform a related operation in the second interface, that is, an operation of selecting a specific option according to needs.

Figure 7:
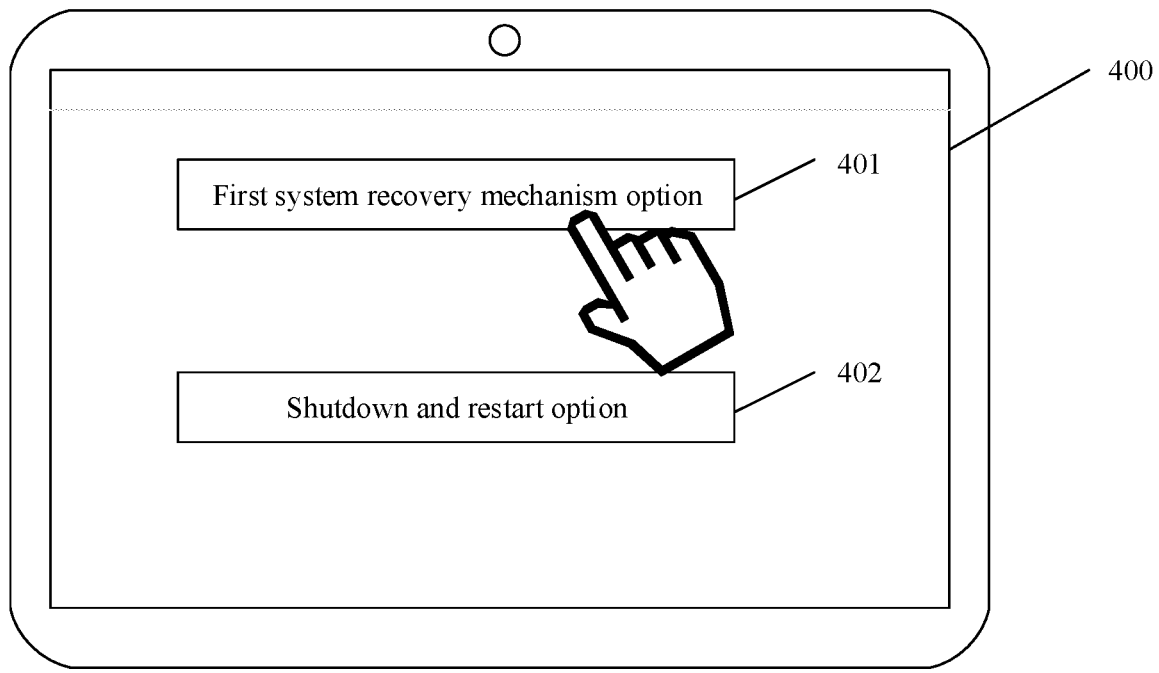
FIG. 7 is a schematic diagram 3 of an example of a display interface of an electronic device according to an embodiment of this application.

For example, the electronic device is a computer, and the second interface includes the first system recovery mechanism option and the shutdown and restart option. As shown in FIG. 7, at the BIOS boot stage, the user presses the hot key F10 of the computer, and when the system recovery indication information is a second identifier, the computer displays a second interface 400. The second interface 400 includes the first system recovery mechanism option 401 and the shutdown and restart option 402. The user can select (for example, click) any one (for example, select the first system recovery mechanism option) of the foregoing two options according to needs.

If the user selects the first system recovery mechanism option, the following S2121a and S2121b are performed:

S2121a: The electronic device receives a selection operation on the first system recovery mechanism option.

S2121b: The electronic device runs the first system recovery mechanism in response to the selection operation on the first system recovery mechanism option.

For detailed descriptions of S2121a and S2121b, refer to related descriptions of S2101a and S2101b. Details are not described herein again.

If the user selects the shutdown and restart option, the following S2122a and S2122b are performed:

S2122a: The electronic device receives a selection operation on the shutdown and restart option.

S2122b: The electronic device responds to the selection operation on the shutdown and restart option, and restarts after power-off For detailed descriptions of S2122a and S2122b, refer to related descriptions of S2104a and S2104b. Details are not described herein again.

It can be understood that, to implement the foregoing functions, the electronic device includes a corresponding hardware structure and/or software module for performing each of the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the foregoing electronic device may be divided into functional modules based on the foregoing method examples. For example, each functional module may be obtained through division for a corresponding function, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 8:
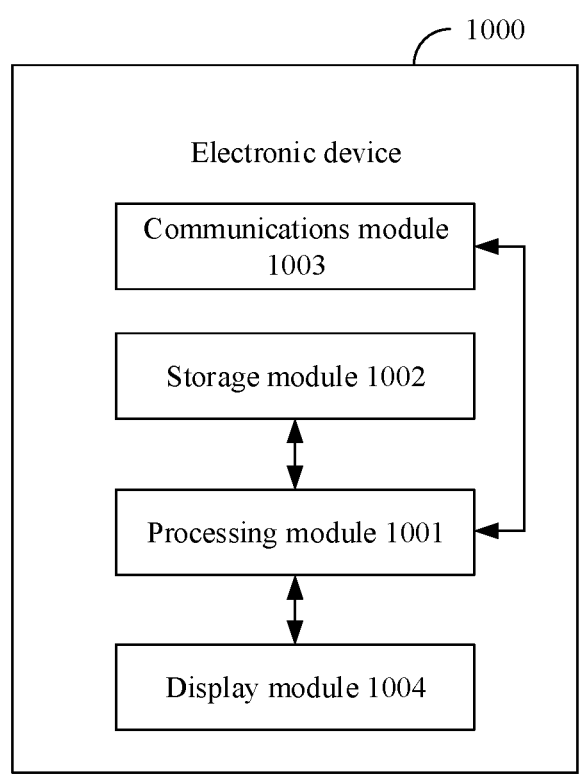
FIG. 8 is a schematic structural diagram of an electronic device according to an embodiment of this application.

For example, FIG. 8 is a possible schematic structural diagram of an electronic device in the foregoing embodiments. The electronic device 1000 includes: a processing module 1001, a storage module 1002, a communications module 1003, and a display module 1004. The processing module 1001 is configured to obtain a quantity of abnormal shutdowns of an electronic device at a BIOS boot stage of the electronic device. For example, the processing module 1001 is configured to support the electronic device in performing S101 and S206 in the foregoing embodiments. The storage module 1002 can be configured to store data or program code. The processing module 1001 is further configured to: when the quantity of abnormal shutdowns of the electronic device is greater than or equal to a preset threshold, control the display module 1004 to display a first interface. The first interface includes a first system recovery mechanism option. For example, the processing module 1001 is configured to support the electronic device in performing S102 in the foregoing embodiment. The processing module 1001 is further configured to: receive a selection operation on the first system recovery mechanism option through the communications module 1003, and run the first system recovery mechanism in response to the selection operation on the first system recovery mechanism option. For example, the processing module 1001 is configured to support the electronic device in performing S103 and S104 in the foregoing embodiment.

Optionally, the foregoing processing module 1001 is further configured to obtain advanced startup indication information of the electronic device, where the advanced startup indication information is used to instruct the processing module 1001 to run the second system recovery mechanism. For example, the processing module 1001 is configured to support the electronic device in performing S205 in the foregoing embodiment.

Optionally, the first interface further includes at least one of the following: a second system recovery mechanism option, a startup-continued option, and a shutdown and restart option. If the quantity of abnormal shutdowns of the electronic device is greater than or equal to a preset threshold, the processing module 1001 is further configured to: receive a selection operation on the second system recovery mechanism option through the communications module 1003, and run the second system recovery mechanism in response to the selection operation on the second system recovery mechanism option. For example, the processing module 1001 is configured to support the electronic device in performing S2102a and S2102b in the foregoing embodiment.

The processing module 1001 is further configured to: at the BIOS boot stage of the electronic device, if a user manually presses a first system recovery hot key, control the display module 1004 to display a second interface, where the second interface includes the first system recovery mechanism option and the shutdown and restart option. The processing module 1001 is further configured to: receive a selection operation on the first system recovery mechanism option through the communications module 1003, and run the first system recovery mechanism in response to the selection operation on the first system recovery mechanism option. For example, the processing module 1001 is configured to support the electronic device in performing S211, S2121a, and S2121b in the foregoing embodiment.

Optionally, the processing module 1001 is further configured to: increase the quantity of abnormal shutdowns by 1 during the startup of the electronic device; and during subsequent running of the electronic device, if the electronic device shuts down normally, clear the quantity of abnormal shutdowns, or if the electronic device shuts down abnormally, skip clearing the quantity of abnormal shutdowns.

Optionally, the processing module 1001 is further configured to: obtain a status of an EC at the BIOS boot stage of the electronic device, where the status of the EC indicates whether there is a shutdown event triggered by a watchdog mechanism in the electronic device; and if there is a shutdown event triggered by the watchdog mechanism in the electronic device, reduce the quantity of abnormal shutdowns obtained by the electronic device at the BOIS boot stage by 1.

Certainly, the electronic device 1000 includes but is not limited to the units and modules listed above. For example, the electronic device 1000 may further include a receiving module and a sending module. The receiving module is configured to receive data or an instruction sent by another electronic device. The sending module is configured to send data or an instruction to another electronic device. In addition, functions that the functional units can specifically implement include but are not limited to the functions corresponding to the method steps in the foregoing embodiment. For detailed descriptions of other units of the electronic device 1000, refer to the detailed descriptions of the method steps corresponding to the units. Details are not described herein again in the embodiment of this application.

In the embodiments of this application, the processing module 1001 may be a processor or a controller, such as may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module may be a transceiver, a transceiver circuit, a communications interface, or the like. The storage module 1002 may be a memory.

The processing module 1001 is a processor (for example, a processor 10 shown in FIG. 1), the storage module 1002 is a memory (for example, an internal memory 111 shown in FIG. 1), and the communications module 1004 may be a communications interface. The display module 1004 is a touchscreen (including a display screen 131 shown in FIG. 1, where the display screen 131 integrates a display panel and a touch panel). The electronic device provided in the embodiment of this application may be the electronic device 100 shown in FIG. 1. The processor, the communications interface, the touchscreen, the memory, and the like may be coupled together through a bus.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, solid state drives (SSD)), or the like.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A system recovery method, wherein the method is applied to an electronic device, and the method comprises:
   obtaining a quantity of abnormal shutdowns of the electronic device at a basic input output system (BIOS) boot stage of the electronic device;
   obtaining a status of an embedded controller (EC) at the BIOS boot stage of the electronic device, wherein the status of the EC indicates whether there is a shutdown event triggered by a watchdog mechanism in the electronic device;
   in response to there being a shutdown event triggered by the watchdog mechanism in the electronic device, reducing the quantity of abnormal shutdowns of the electronic device by 1 and using the reduced quantity of abnormal shutdowns of the electronic device as the quantity of abnormal shutdowns of the electronic device;
   in response to the quantity of abnormal shutdowns of the electronic device being greater than or equal to a preset threshold:
      displaying a first interface, wherein the first interface comprises a first system recovery mechanism option;
      receiving a selection operation on the first system recovery mechanism option;
      running a first system recovery mechanism in response to the selection operation on the first system recovery mechanism option;
   in response to the quantity of abnormal shutdowns of the electronic device being less than the preset threshold:
      continuing according to a normal startup process; and
      running a power-on self-test process.

2. The system recovery method according to claim 1, wherein before obtaining the quantity of abnormal shutdowns of the electronic device, the method further comprises: obtaining advanced startup indication information of the electronic device, wherein the advanced startup indication information is used to instruct the electronic device to run a second system recovery mechanism.

3. The system recovery method according to claim 1, wherein the first interface further comprises at least one of the following: a second system recovery mechanism option, a startup-continued option, and a shutdown and restart option; and
   when the quantity of abnormal shutdowns of the electronic device is greater than or equal to the preset threshold, the method further comprises:
   receiving a selection operation on the second system recovery mechanism option; and
   running the second system recovery mechanism in response to the selection operation on the second system recovery mechanism option.

4. The system recovery method according to claim 1, wherein the method further comprises:
   at the BIOS boot stage of the electronic device, in response to receiving an indication of a user selection of a first system recovery hot key, displaying, by the electronic device, a second interface, wherein the second interface comprises the first system recovery mechanism option and a shutdown and restart option;
   receiving the selection operation on the first system recovery mechanism option; and
   running the first system recovery mechanism in response to the selection operation on the first system recovery mechanism option.

5. The system recovery method according to claim 1, wherein the method further comprises:
   increasing the quantity of abnormal shutdowns by 1 during a startup of the electronic device; and
   during a subsequent running of the electronic device, when the electronic device shuts down normally, clearing the quantity of abnormal shutdowns; or when the electronic device shuts down abnormally, skipping clearing the quantity of abnormal shutdowns.

6. The system recovery method according to claim 1, wherein
   the first system recovery mechanism is a system recovery mechanism customized by an original equipment manufacturer (OEM), and a second system recovery mechanism is a default system recovery mechanism of Windows.

7. The system recovery method according to claim 1, wherein
the abnormal shutdown of the electronic device comprises at least one of the following: a forcible shutdown, and a shutdown of the electronic device after a blue screen appears.

8. An electronic device, wherein the electronic device comprises a processor, a memory, a communication interface and a touchscreen; the memory and the communications interface are coupled to the processor; the touchscreen is configured to display an image generated by the processor; the memory is configured to store computer program code; the computer program code comprises a computer instruction; and when the processor executes the computer instruction, the processor is configured to:
obtain a quantity of abnormal shutdowns of the electronic device at a basic input output system (BIOS) boot stage of the electronic device;
obtain a status of an embedded controller (EC) at the BIOS boot stage of the electronic device, wherein the status of the EC indicates whether there is a shutdown event triggered by a watchdog mechanism in the electronic device;
in response to there being a shutdown event triggered by the watchdog mechanism in the electronic device, reduce the quantity of abnormal shutdowns of the electronic device by 1 and use the reduced quantity of abnormal shutdowns of the electronic device as the quantity of abnormal shutdowns of the electronic device;
in response to the quantity of abnormal shutdowns of the electronic device being greater than or equal to a preset threshold:
control the touchscreen to display a first interface, wherein the first interface comprises a first system recovery mechanism option; and
receive a selection operation on the first system recovery mechanism option through the communications interface, and run a first system recovery mechanism in response to the selection operation on the first system recovery mechanism option;
in response to the quantity of abnormal shutdowns of the electronic device being less than the preset threshold:
continue according to a normal startup process; and
run a power-on self-test process.

9. The electronic device according to claim 8, wherein when the processor executes the computer instruction, the processor is further configured to obtain advanced startup indication information of the electronic device, wherein the advanced startup indication information is used to instruct the processor to run a second system recovery mechanism.

10. The electronic device according to claim 8, wherein the first interface further comprises at least one of the following: a second system recovery mechanism option, a startup-continued option, and a shutdown and restart option; and
when the processor executes the computer instruction, the processor is further configured to: receive a selection operation on the second system recovery mechanism option through the communications interface, and run the second system recovery mechanism in response to the selection operation on the second system recovery mechanism option.

11. The electronic device according to claim 8, wherein when the processor executes the computer instruction, the processor is further configured to: at the BIOS boot stage of the electronic device, in response to receiving an indication of a user selection of a first system recovery hot key, control the touchscreen to display a second interface, wherein the second interface comprises the first system recovery mechanism option and a shutdown and restart option; and
receive the selection operation on the first system recovery mechanism option, and run the first system recovery mechanism in response to the selection operation on the first system recovery mechanism option.

12. The electronic device according to claim 8, wherein when the processor executes the computer instruction, the processor is further configured to:
increase the quantity of abnormal shutdowns by 1 during a startup of the electronic device; and
during a subsequent running of the electronic device, when the electronic device shuts down normally, clear the quantity of abnormal shutdowns; or when the electronic device shuts down abnormally, skip clearing the quantity of abnormal shutdowns.

13. The electronic device according to claim 8, wherein the first system recovery mechanism is a system recovery mechanism customized by an original equipment manufacturer (OEM), and a second system recovery mechanism is a default system recovery mechanism of Windows.

14. The electronic device according to claim 8, wherein the abnormal shutdown of the electronic device comprises at least one of the following: a forcible shutdown, and a shutdown of the electronic device after a blue screen appears.

15. A non-transitory computer readable medium configured to store instructions that, when executed by at least one processor of an electronic device, cause the electronic device to perform operations comprising:
obtaining a quantity of abnormal shutdowns of the electronic device at a basic input output system (BIOS) boot stage of the electronic device;
obtaining a status of an embedded controller (EC) at the BIOS boot stage of the electronic device, wherein the status of the EC indicates whether there is a shutdown event triggered by a watchdog mechanism in the electronic device;
in response to there being a shutdown event triggered by the watchdog mechanism in the electronic device, reducing the quantity of abnormal shutdowns of the electronic device by 1 and using the reduced quantity of abnormal shutdowns of the electronic device as the quantity of abnormal shutdowns of the electronic device;
in response to the quantity of abnormal shutdowns of the electronic device being greater than or equal to a preset threshold:
displaying a first interface, wherein the first interface comprises a first system recovery mechanism option;
receiving a selection operation on the first system recovery mechanism option;
running a first system recovery mechanism in response to the selection operation on the first system recovery mechanism option;
in response to the quantity of abnormal shutdowns of the electronic device being less than the preset threshold:
continuing according to a normal startup process; and
running a power-on self-test process.

16. The non-transitory computer readable medium according to claim 15, wherein the operations further comprise:
obtaining advanced startup indication information of the electronic device, wherein the advanced startup indication information is used to instruct the electronic device to run a second system recovery mechanism.

17. The non-transitory computer readable medium according to claim 15, wherein the first interface further comprises at least one of the following: a second system recovery mechanism option, a startup-continued option, and a shutdown and restart option; and
  when the quantity of abnormal shutdowns of the electronic device is greater than or equal to the preset threshold, the operations further comprise:
  receiving a selection operation on the second system recovery mechanism option; and
  running the second system recovery mechanism in response to the selection operation on the second system recovery mechanism option.

18. The non-transitory computer readable medium according to claim 15, wherein the operations further comprise:
  at the BIOS boot stage of the electronic device, in response to receiving an indication of a user selection of a first system recovery hot key, displaying, by the electronic device, a second interface, wherein the second interface comprises the first system recovery mechanism option and a shutdown and restart option;
  receiving the selection operation on the first system recovery mechanism option; and
  running the first system recovery mechanism in response to the selection operation on the first system recovery mechanism option.

* * * * *